United States Patent [19]
Patten

[11] Patent Number: 6,053,269
[45] Date of Patent: Apr. 25, 2000

[54] VEHICLE/BRIDGE VIBRATION MITIGATION ASSEMBLY

[75] Inventor: William N. Patten, Norman, Okla.

[73] Assignee: The Board of Regents of the University of Oklahoma

[21] Appl. No.: 09/133,547

[22] Filed: Aug. 13, 1998

[51] Int. Cl.⁷ .................................................. B60T 7/16
[52] U.S. Cl. ................................................. 180/167
[58] Field of Search .................................. 280/5.5, 5.04; 180/167; 701/37, 38, 39, 111

[56] References Cited

U.S. PATENT DOCUMENTS

| | | | |
|---|---|---|---|
| 3,359,802 | 12/1967 | Sollenberger et al. | 188/313 |
| 3,387,748 | 6/1968 | Brenchley | 251/129.11 |
| 4,181,288 | 1/1980 | Bylsma | 251/129.11 |
| 4,511,022 | 4/1985 | Thomas et al. | 188/299 |
| 4,655,440 | 4/1987 | Eckert | 267/64.11 |
| 4,821,849 | 4/1989 | Miller | 188/280 |
| 4,838,392 | 6/1989 | Miller et al. | 188/277 |
| 4,887,699 | 12/1989 | Ivers et al. | 188/378 |
| 4,898,264 | 2/1990 | Miller | 188/275 |
| 4,936,423 | 6/1990 | Karnopp | 188/299 |
| 4,936,425 | 6/1990 | Boone et al. | 188/299 |
| 4,956,947 | 9/1990 | Middleton | 52/1 |
| 4,986,393 | 1/1991 | Preukschat et al. | 188/299 |
| 5,034,890 | 7/1991 | Sugasawa et al. | 364/424.05 |
| 5,056,811 | 10/1991 | Fukunaga et al. | 280/707 |
| 5,065,552 | 11/1991 | Kobori et al. | 52/1 |
| 5,147,018 | 9/1992 | Kobori et al. | 88/300 |
| 5,152,110 | 10/1992 | Garza-Tamez | 52/167 |
| 5,251,730 | 10/1993 | Ackerman et al. | 188/299 |
| 5,259,487 | 11/1993 | Petek | 188/267 |
| 5,277,281 | 1/1994 | Carlson et al. | 188/267 |
| 5,284,330 | 2/1994 | Carlson et al. | 267/140.14 |
| 5,311,709 | 5/1994 | Kobori et al. | 52/167 |
| 5,360,230 | 11/1994 | Yamada et al. | 280/707 |
| 5,396,973 | 3/1995 | Schwemmer et al. | 188/299 |
| 5,595,372 | 1/1997 | Patten | 267/64.13 |
| 5,652,704 | 7/1997 | Catanzarite | 364/424.059 |
| 5,987,369 | 11/1999 | Kwak et al. | 701/37 |

OTHER PUBLICATIONS

Publication—U.S. National Workshop on Structural Control Research, Oct. 25–26, 1990, University of Southern California, sponsored by U.S. National Science Foundation, pp. 106–113.

Article —DE–vol. 40, Advanced Automotive Technologies ASME 1991 entitled Semi–Active Suspension Technology: An Evolutionary View, pp. 327–347.

*Primary Examiner*—Brian L. Johnson
*Assistant Examiner*—Faye M. Fleming
*Attorney, Agent, or Firm*—Dunlap, Codding & Rogers, P.C.

[57] ABSTRACT

A vibration mitigation assembly for mitigating vibration of a bridge as a vehicle travels across the bridge is provided. The vibration mitigation assembly includes a plurality of adjustable actuator assemblies having a first fluid chamber and a second fluid chamber interconnected by a valve. The actuator assemblies being connected to the vehicle and motion sensors being attached to the vehicle to measure vibration of the vehicle. In response to the motion data, a controller outputs a control signal to the valve to vary the flow rate of the fluid between the first and second chambers such that the amount of vibration energy dissipated by the vibration mitigation assembly is selectively varied whereby both a stiffness of the adjustable actuator assemblies and the amount of damping are continuously adjusted to prevent resonant coupling between the vehicle and the bridge over which the vehicle is traveling.

26 Claims, 4 Drawing Sheets

VEHICLE/BRIDGE VIBRATION MITIGATION ASSEMBLY

STATEMENT REGARDING FEDERALLY SPONSORED RESEARCH OR DEVELOPMENT

The U.S. Government may have certain rights to this invention and the right in limited circumstances to require the patent owner to license others on reasonable terms as provided by the terms of Grant No. CMS-9625715 awarded by National Science Foundation.

CROSS-REFERENCE TO RELATED APPLICATIONS

Not applicable.

BACKGROUND OF THE INVENTION

1. Field of the Invention

The present invention relates generally to adjustable devices that provide selectable levels of dampening and/or stiffness, and more particularly, but not by way of limitation, to an improved vibration mitigation assembly for suppressing vibrations of civil structures, such as bridges.

2. Description of the Related Art

A recent report (1995) by the Federal Highway Administration indicates that approximately 23% of the bridge inventory in the U.S. is currently rated as deficient. Ten percent of all bridges in the U.S. are considered structurally deficient, and that percentage is growing each year. If those bridges are not repaired or replaced, then they will have to be derated or closed. With over 550,000 bridges in use, it is easy to appreciate the enormous negative impact that a decaying bridge infrastructure will have on the nation's economy.

Projections made by FHWA to Congress on the cost to repair the bridge infrastructure are now estimated to exceed $6 billion per year over a 25-year period. That will require a ten-fold increase in the present level of funds appropriated each year in the federal and state transportation budgets for bridges. The U.S. congress, state legislators, and the taxpayers continue to balk at the need to increase highway maintenance revenues. However, bridges along the interstate system are particularly critical to the continued growth of commerce.

The interstate roadway system was constructed over a span of five decades. The design of bridges constructed during this period mirrored the limitations of available capital and inaccurate projections on the growth of trucking commerce. As a result, many interstate bridges are now near the end of their useful service life. The simultaneous repair or replacement of all those thousands of obsolete bridges over a short period of time is not economically feasible. Departments of transportation around the country are now anxious to find an alternative means of dealing with the decay of the bridge infrastructure.

Suspicion among the public is that over-the-road trucks are to blame for the accelerated decay of America's bridges. The growth of trucking commerce in the U.S. has far exceeded the expectations of transportation economists. That growth reflects the extremely robust economy of the nation since the end of World War II. The trucking industry would argue that as daily truck counts increase so do the collected fees levied on trucks, which are intended to offset the cost increment in roadway maintenance that results from truck traffic. In addition, the federal government's increase in maximum permissible weight of a truck on the interstate system from 72,000 lbs. to 80,000 lbs. in the early 1980's is also considered by many to have had a significant negative impact on the useful life remaining of a bridge. The trucking industry, however, was assessed additional user fees to compensate for increased wear caused by heavier loads.

While increases in truck counts and truck weights are important, it is becoming increasingly clear that the useful life of bridges is now most affected by the deleterious vibratory characteristic of a heavy truck chassis. That is, it has been found that the low frequency sprung mass modes of heavy trucks correspond very closely to several of the fundamental modes of a majority of bridges. A review of the literature and surveys of truck manufacturers indicates that all heavy trucks, whether outfitted with leaf spring suspensions, air suspensions and/or passive hydraulic dampers, possess vibration modes between 1.5 Hz. and 5 Hz. What is disconcerting is that a survey of continuous plate girder bridges with spans ranging from 60 feet to 150 feet (which represents approximately 50% of the highway bridges) reveals that the generic design common to interstate bridges almost always results in bridge vibration modes that coincide with the suspension vibration modes of the truck. This is true whether the bridge is constructed of steel or precast concrete.

Thus, the core of the problem is that a vibrating truck chassis oscillates at a frequency that resonates near one or more of the bridge fundamental modes. That resonance condition results in dynamic loads imposed on the bridge structure that are typically 1.5 to 2.5 times the weight of the vehicle measured statically. The bridge fatigue design code that is relied on by bridge engineers to assess the remaining life of bridges suggests that a dynamic magnification factor of 1.15 is realistic, with a maximum magnification factor of 1.3 recommended for only the most conservative analysis.

Bridge researchers that have been investigating bridge/truck vibration resonance are now proposing that fatigue life prediction codes be revised to reflect the much larger dynamic impacts that occur if a bridge's modal frequencies correspond to the vibration suspension modes typical to heavy over-the-road trucks. Those revised codes will inevitably predict significantly less remaining service life for bridges now in use.

Correcting the fatigue codes does not alleviate the immediate problem, but it does provide a more reliable guideline for the design of future highway bridges. The highway engineering community is now considering an alternative approach, bridge friendly truck suspensions. However, while new trucks can be made bridge-friendly by design, trucks presently on the road will continue to pose a serious problem to bridge integrity.

To this end, what is needed is a low-cost means of fitting truck suspensions with technology that can automatically change the truck suspension vibration characteristics to avoid resonating with a bridge while the truck is passing over the bridge. It is to such a vibration mitigation assembly that the present invention is directed.

BRIEF SUMMARY OF THE INVENTION

The present invention is directed to a vibration mitigation assembly for mitigating vibration of a bridge as a vehicle travels across the bridge. The vibration mitigation assembly includes a plurality of adjustable actuator assemblies having a piston defining a first fluid chamber and a second fluid chamber interconnected by a valve. The actuator assemblies are connected to the vehicle and motion sensors are attached to the vehicle to measure vibration of the vehicle. In response to the motion data, a controller outputs a control signal to the valve to vary the flow rate of the fluid between the first and second chambers such that the amount of vibration energy dissipated by the vibration mitigation assembly is selectively varied whereby both a stiffness of the adjustable actuator assemblies and the amount of damping are continuously adjusted to prevent resonant coupling between the vehicle and the bridge over which the vehicle is traveling.

In a first mode of operation, the vibration mitigation assembly treats the vibration of the bridge as an unknown system disturbance. Therefore, control decisions are made based on the dynamics of the vehicle chassis only. In a second mode of operation, the vibration mitigation assembly utilizes the vehicle mounted sensors to estimate the motion of the bridge and incorporates that information in any control decision. In a third mode of operation, the vibration mitigation assembly operates with an explicit knowledge of the motion of the bridge and a model of the coupled bridge/vehicle dynamics. Sensors attached to the bridge measure the motion of the bridge. Data signals indicative of the motion of the bridge are transmitted to the controller on the vehicle via wireless communication. In a fourth mode of operation, the vibration mitigation assembly operates in cooperation with a bridge motion control system. The vibration mitigation assembly and the bridge control system share data and determine a mutually beneficial set of control actions.

The objects, features and advantages of the present invention will become apparent from the following detailed description when read in conjunction with the accompanying drawings and appended claims.

DETAILED DESCRIPTION OF THE INVENTION

Figure 1:
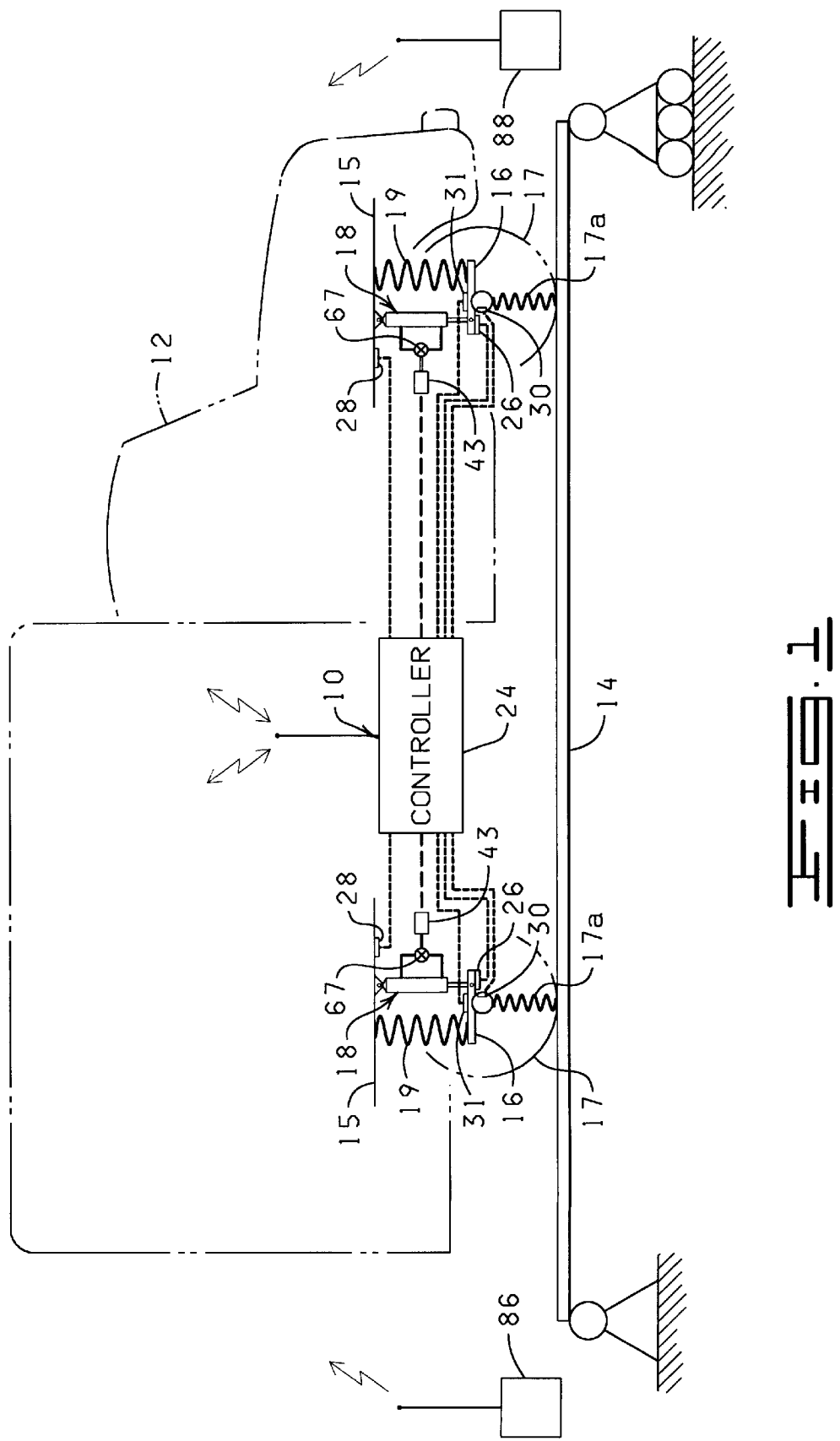
FIG. 1 is a schematic view of a truck traveling across a bridge and provided with a vibration mitigation assembly constructed in accordance with the present invention.

Referring now to the drawings and more particularly to FIG. 1, a vibration mitigation assembly 10 constructed in accordance with the present invention is schematically shown mounted to a vehicle 12 that is traveling across a bridge 14. As well known, the vehicle 12 has a chassis 15 and a plurality of axles 16 (only two of the axles 16 being shown in FIG. 1) for supporting elastic tires 17. The elasticity of tires 17 is represented by the spring 17a. A spring 19 is disposed between the chassis 15 and the axle 16. The spring 19 can be any conventional spring, such as a leaf spring or a coil spring.

As described above, certain vehicles, in particular large trucks, exhibit modal frequencies between one and five Hertz. Likewise, many of the bridges constructed along the U.S. interstate highway system with a span between 60 and 150 feet exhibit modal response frequencies between one and five Hertz. Consequently, when such a vehicle travels over one of these bridges, the vehicle and the bridge often interact to cause a resonance condition, which in turn amplifies the vibration of the bridge to levels that far exceed the levels anticipated by standard bridge codes. The vibration mitigation assembly 10 provides a low-cost means of fitting the suspension of a vehicle with technology that can automatically change the vehicle suspension vibration characteristics to avoid resonating with the bridge 14 while the vehicle 12 is passing over the bridge 14, and thereby mitigate vibration of the bridge 14.

The vibration mitigation assembly 10 described herein is commonly referred to as a semi-active device in that the power required to operate a semi-active vibration mitigation assembly is low relative to the amount of energy dissipated; whereas, the amount of power required to operate a fully active vibration mitigation assembly is approximately equal to or greater than the amount of energy to be dissipated. The vibration mitigation assembly 10 can alternatively be outfitted with fully active devices to effectively alter the fundamental dynamics of the chassis 15 of the vehicle 12. However, active vibration mitigation systems require significant power and costly hydraulic pumping equipment to provide force inputs to the suspension during a dynamic event. On the other hand, the hardware utilized in semi-active vibration mitigation systems generally includes a high pressure hydraulic cylinder with a piston slidably disposed therein so as to form a fluid-filled chamber in each end of the cylinder. To permit fluid to flow from one chamber to the other, the chambers are fluidly interconnected with plumbing. In a preferred embodiment, an electromechanical control valve is interposed in the plumbing to control the flow of fluid between the chambers. Energy is dissipated from the structure to which the semi-active vibration mitigation system is connected by actuating the control valve so as to vary the flow area of the valve. The valve is actuated by control signals generated by a controller in response to data obtained from structural motion sensing devices, such as accelerometers and strain gauges, and from pressure data obtained from sensors attached to the hydraulic system.

More specifically, the vibration mitigation assembly 10 includes a plurality of hydraulic actuator assemblies 18 and a controller 24 electrically connected to each of the hydraulic actuator assemblies 18 for generating a control signal. While only two of the hydraulic actuator assemblies 18 are illustrated in FIG. 1, it should be realized that one or more of the hydraulic actuator assemblies 18 may be mounted to each axle of the vehicle in a manner similar to which a conventional shock absorber would be installed on the vehicle 12.

The controller 24 can be any suitable device for generating control signals, but a preferable device is a digital signal processor. As described in greater detail below, the control signal is generated in response to data signals produced by a variety of sensors connected to the vehicle 12 and transmitted to the controller 24. The sensors may include accelerometers 26 and 28, tire pressure sensor 30, and axle shear force sensor or strain gauge 31.

While the vehicle 12 is crossing the bridge 14, the sensors 26–31 produce data signals indicative of the movement or deformation of the vehicle 12. Other sensors (described below) produce data signals indicative of the pressure differential between a first fluid chamber of the actuator assembly 18 and a second fluid chamber of the actuator assembly 18, and data signals indicative of the relative velocity of a piston (described below) across the actuator assembly 18. The controller 24 receives all the data signals and outputs a control signal to a motor which throttles a control valve so as to vary the orifice area of the control valve. The change in the orifice area affects two modes of energy transfer. First, the variation of the orifice area affects the amount of fluid flow between the first and second fluid chambers which in turn affects the amount of energy being dissipated from the vehicle 12. Varying the amount of energy dissipated from the structure in turn varies the apparent damping in the vehicle 12. Second, the variation of the orifice area affects the amount of elastic deformation of the fluid in the actuator assembly 18, thus making it possible to regulate the amount of elastic or strain energy stored in the fluid. Regulation of the storage of elastic energy in turn permits the regulation of the apparent stiffness of the vehicle 12.

Figure 2:
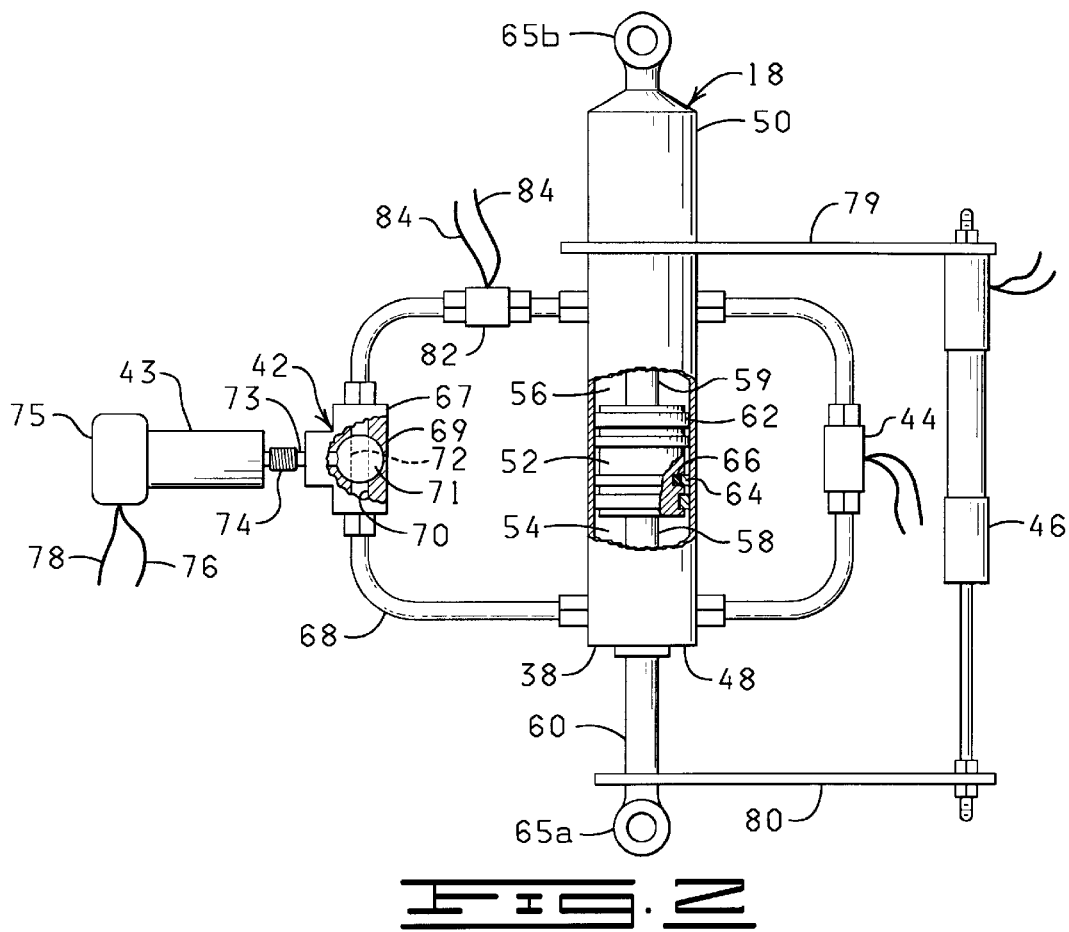
FIG. 2 is a schematic view of a semi-active actuator utilized in the vibration mitigation assembly of the present invention.

FIG. 2 shows the actuator assembly 18 for use in the vibration mitigation assembly 10 of the present invention in more detail. The actuator assembly 18 includes a double rod hydraulic cylinder 38, a valve assembly 42, a motor 43, a differential pressure sensor 44, and a linear variable displacement transducer (LVDT) 46.

The cylinder 38 is characterized as having a first end 48 and a second end 50. A piston 52 is slidably disposed in the cylinder 38 so as to form a first fluid chamber 54 and a second fluid chamber 56. The piston 52 has a piston rod 58 extending from one face of the piston 52 and a piston rod 59 extending from the opposite face of the piston 52. The piston rod 58 slidably extends from the first end 48 of the cylinder 38 and has a rod end 60, and the piston rod 59 slidably extends from the second end 50 of the cylinder 38 and has a free rod end (not shown).

The piston 52 is provided with a piston seal assembly that specifically meets the needs of a semi-active vibration damping system. The seal assembly includes a pair of bearings 62, a pair of seal rings 64 and a pair of energizing rings 66. The seal rings 64 and the energizing rings 66 are disposed in an annular groove provided in the piston 52 substantially as shown in FIG. 2. The seal rings 64 and the energizing rings 66 cooperate to form a fluid tight seal between the piston 52 and the sidewall of the cylinder 38. The seal rings 64 are constructed of a material having a low coefficient of friction, such as tephlon, and have a symmetrical geometric configuration to provide uniform frictional engagement with the sidewall of the cylinder 38.

A typical U-cup seal member, which is often used in active damping systems, is not well suited to semi-active damping applications. The U-cup seal is a hydraulic pressure energized device. As hydraulic pressure increases, the seal cross-section distorts resulting in increased contact force with the sidewall of the cylinder thus increasing the friction between the seal member and the cylinder. The geometry of the U-cup seal is effective in an active damping system because the induced velocity in the cylinder is typically in the same direction as the net force on the piston due to the differential pressure in the two fluid chambers. Therefore, the friction force acts to restore the original shape of the seal member. However, the orientation between the net force and the velocity in the semi-active damping system is opposite to the active damping system. Thus, in a semi-active system the friction force adds to the distortion of the seal member and increases the total friction like a self actuating brake mechanism, thereby impeding the performance of the semi-active damping assembly.

The bearings 62 are disposed in the piston 52 to the outside of the seal rings 64, as shown. The bearings 62 are constructed of a material having a low coefficient of friction, such as nylon or graphite. The bearings 62 function to maintain uniform contact between the piston 52 and the sidewall of the cylinder 38. Any torque imparted to the actuator assembly 18 is transmitted to the bearings 62, as opposed to the seal rings 64, thus preventing fluid leakage about the piston 52.

The rod end 60 has an elastic bushing 65*a* and is adapted to be pivotally connected to one of the axles 16 of the vehicle 12, and the second end 50 of the cylinder 38 has an elastic bushing 65*b* and is adapted to be connected to the chassis 15 of the vehicle 12 in a manner similar to that for connecting a conventional shock absorber to the vehicle 12.

The valve assembly 42 includes a control valve 67 and a fluid conduit 68. The fluid conduit 68 extends from the first fluid chamber 54 to the second fluid chamber 56, thus providing fluid communication between the first fluid chamber 54 and the second fluid chamber 56. The control valve 67 is interposed in the fluid conduit 68 for regulating the flow of the fluid between the first fluid chamber 54 and the second fluid chamber 56.

A preferable control valve is a globe valve manufactured by the Whitey Corporation, model number SS-33 VF4, which is modified with a low friction seal (not shown) in order to afford high speed changes in the valve opening when in operation. The control valve 67 includes a valve body 69 having a flow bore 70 extending therethrough and a valve ball 71 with a fluid flow passageway 72 extending therethrough.

The fluid conduit 68 is adapted to be connected to an accumulator (not shown) if desired. However, an accumulator is not required in the vibration mitigation assembly 10 of the present invention.

The control valve 67 is rotatable between a full open position wherein the fluid flow passageway 72 of the valve ball 71 is aligned with the flow bore 70 of the valve body 69 and a full closed position wherein the fluid flow passageway 72 of the valve ball 71 is sealed from the flow bore 70 of the valve body 69. The valve ball 71 is rotated between the full open position and the full closed position by the motor 43 which is connected to the valve ball 71 via a valve stem 73 with a shaft coupling 74. The motor 43 is preferably a low inductance dc motor that is able during operation to be rotated 45° in less than 0.01 seconds. Such a motor is available from Hewlett Packard, model number T03L-QU99 (B87779-01). The motor 43 is provided with an encoder 75 which generates a signal indicative of the angle of rotation of the shaft of the motor 43 and thus the control valve 67. The motor 43 is electrically connected to the controller 24 via electric leads 76, 78. The shaft coupling 74 is preferably a helical flexible shaft coupling such as available from the Berg Corporation, model No. ACR112-12-8. This type of coupling allows for misalignment between the shaft of the motor 43 and the valve stem 73 of the control valve 67 while being torsionally rigid, thus minimizing the torque load on the motor 43.

The differential pressure sensor 44 is disposed in fluid communication between the first fluid chamber 54 and the second fluid chamber 56, and the LVDT 46 is mounted parallel to the piston rod 58 to measure the position of the piston 52. More specifically, the LVDT 46 has one end fixed to a position of the cylinder 38 via a bracket 79, and the opposite end of the LVDT 46 is mounted to a bracket 80 mounted on the piston rod 58.

In order to take advantage of both the dissipative and non-dissipative effects of hydraulic fluid, utilization of hydraulic fluid having an amount of air entrained therein is preferred. To this end, a preferred amount of air in the hydraulic fluid is an amount that will produce an effective compressibility of the fluid/air mix that is about 100 more times compressible than commercially available hydraulic fluid or in a range from about $2.7 \times 10^6$ m$^2$/N to about $2.7 \times 10^9$ m$^2$/N.

The control logics (described below), for generating the control signals that throttle the control valve 67, take into account the compressibility of the hydraulic fluid. A change in the temperature of the hydraulic fluid changes the compressibility of the hydraulic fluid. Therefore, a temperature sensor 82, which is connected to the controller 24 via leads 84, is provided to measure the temperature of the hydraulic fluid.

When the vehicle 12 is not passing over a bridge, the controller 24 is set in a normal mode wherein the control valve 67 is set in a full open position so as to operate as a passive damper. To automatically adjust the vibration of the vehicle 12 in response to traveling over a bridge, it is necessary that the controller 24 be set in a bridge mode wherein the controller 24 is instructed that the vehicle is traveling on a bridge. As shown in FIG. 1, this can be accomplished with the use of a presence sensing assembly 86. The presence sensing assembly 86 can be any suitable device for signaling the controller 24 that the vehicle 12 is traveling or is about to travel across the bridge 14. For example, the presence sensing assembly 86 could include photo-electric cells which are mounted on opposite sides of the highway for forming presence sensing beams across the highway preceding the entrance of the bridge for indicating that the vehicle is on the bridge. A second presence sensing assembly 88 is provided to signal the controller 24 that the vehicle 12 has exited the bridge 14. The presence sensing assembly 86 is preferably located a distance sufficient for the controller 24 to be activated before the vehicle 12 enters the bridge 14, for example, a distance of approximately 100 yards. The presence sensing assemblies 86 and 88 can employ various types of sensor medias, including visible light, ultraviolet light, lasers, air, sound waves, and combinations thereof.

Upon the vehicle 12 passing through the presence sensing assembly 86, the presence sensing assembly 86 sends a signal to the controller 24 on board the vehicle 12 to indicate to the controller 24 that the vehicle 12 is traveling over the bridge 14. As the vehicle 12 passes over the bridge 14, the controller 24 receives data signals from the sensors 26–31 positioned on the chassis 15 and the axle 16 of the vehicle 12 and connected to the controller 24 (FIG. 1). It will be appreciated that a plurality of accelerometers and a plurality of strain gauges may be used with each of the accelerometers and strain gauges generating data signals to the controller 24. Alternatively, displacement, velocity or acceleration sensors can be used.

Movement of the vehicle chassis 15 relative to the vehicle axle 16 will apply pressure, via the piston 52, to one of the fluid chambers 54 or 56. The applied pressure will cause hydraulic fluid to flow from the pressurized fluid chamber 54 or 56 through the fluid conduit 68 and the control valve 67. The size of the fluid flow passageway in the control valve 67 will determine at least part of the resistance provided by the vibration mitigation assembly 10. When the vehicle chassis 15 moves in the opposite direction relative to the axle 16 and causes the piston 52 to move in the opposite direction, pressure is applied to the other fluid chamber 54 or 56, causing at least a portion of the hydraulic fluid contained therein to flow through the fluid conduit 68 and the control valve 67 in the opposite direction.

The size of the fluid passageway within the control valve 67 is determined by a control signal generated by the controller 24, as will be explained below. The control signal is sent via the electric leads 76, 78 to the motor 43 which in turn positions the control valve 67.

The control signals for adjusting the control valve 67 can be generated by any suitable algorithm. However, the control signals are preferably generated by a closed loop algorithm. By employing flow continuity, an energy balance across the control valve 67, and accounting for fluid compressibility effects, the following system of hydraulic equations result:

$$\Delta \dot{p} = \alpha \beta \{ A_p \dot{S} + C_d A_v g(\Delta p) \} \tag{1}$$

where $\Delta p$ is the differential pressure, $A_p$ is the effective area of the piston face, and $\dot{S}$ is the relative velocity induced by movement of the structural elements to which the actuator is attached. $C_d$ is an experimentally determined valve discharge coefficient, $A_v$ is the adjustable orifice area, $\beta$ is the bulk modulus of the air/oil mix in the actuator, and $\alpha$ is the time varying volume ratio $(\alpha = (V_a \cdot V_b)/(V_a + V_b))$. The dependence of $\beta$ on p is well known. The function $g(\Delta p)$ is a hydrodynamic loss term, which has the following form:

$$g(\Delta p) = sgn(\Delta p) \left( \frac{2}{\rho} |\Delta p| \right)^q \tag{2}$$

where the sgn( ) function represents the sign of the function in parentheses. That is, if $\Delta p \geq 0$, $sgn(\Delta p) = +1$ and if $\Delta p < 0$, $sgn(\Delta p) = -1$. The power p varies from 1 to 2, with 1 representing laminar flow through the valve and 2 representing completely turbulent flow. Equation (1) establishes the coupling between the actuator state ($\Delta p$) and the state of the motion of the chassis of the truck. The valve orifice area $A_v$ is bounded; $0 \leq A_v \leq A_{vmax}$. Equations (1) and (2) provide the working basis for the inclusion of the semiactive hydraulics into the control design.

The vibration mitigation assembly 10 can be designed to operate in four different modes. First, the vibration mitigation assembly 10 treats the vibration of the bridge 14 as an unknown system disturbance. In that case, control decisions are made based on the dynamics of the vehicle chassis 15 only. Second, the vibration mitigation assembly 10 utilizes the vehicle-mounted sensors to estimate the motion of the bridge 14 and incorporates that information in any control decision. Third, the vibration mitigation assembly 10 operates with an explicit knowledge of the motion of the bridge and a model of the coupled bridge/vehicle dynamics. Fourth, the vibration mitigation assembly 10 operates in cooperation with a bridge motion control system. The vibration mitigation assembly 10 and the bridge control system share data and determine a mutually beneficial set of control actions.

Figure 3:
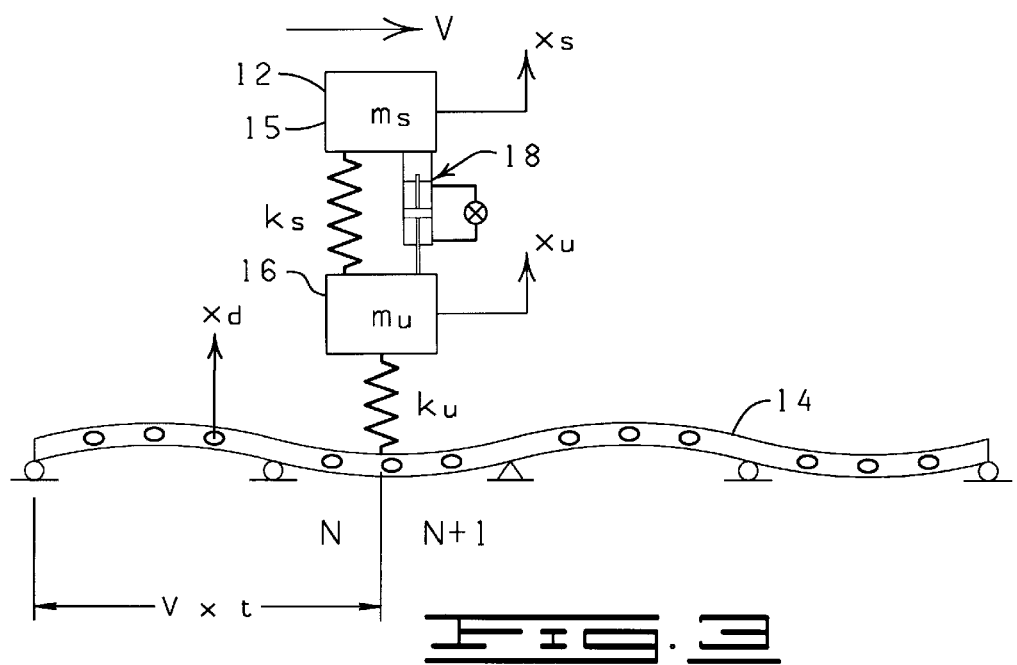
FIG. 3 is a schematic view of the vibrational interaction between a vehicle and a bridge.

In the first mode, the vibration mitigation assembly 10 operates without any information about the motion of the bridge 14. The design of this control is based on the fact that it is unlikely that all bridges will be outfitted with motion sensors and telemetry equipment for signaling to the controller 24 information regarding the vibration of the bridge as the vehicle is traveling across the bridge. Consequently, the control signals will have to be generated without knowledge of the bridge dynamics. A schematic diagram portraying the bridge/truck interaction is shown in FIG. 3.

The equations of motion of the vehicle chassis 15 can be written as:

$$m_s \ddot{x}_s = -k_s (x_s - x_u) - A_p \cdot \Delta p \tag{3}$$

$$m_u \ddot{x}_u = +k_s(x_s - x_u) - k_u(x_u - x_d) + A_p \cdot \Delta p \tag{4}$$

where $A_p \cdot \Delta p$ is the force output of the vibration mitigation assembly 10.

Defining $x = \{x_u, x_s, \dot{x}_u, \dot{x}_s, \Delta p\}$ and noting that $\dot{S} = \dot{x}_s - \dot{x}_u$, and that $x_d$ represents the motion of the bridge at the tire, then Equations (1)–(4) can be combined to represent the coupled vehicle chassis and actuator dynamics:

$$\dot{x} = Ax + Bg(x)u + d \tag{5}$$

$$g(x) = sgn(x_5)\sqrt{\frac{2|x_5|}{\rho}} \tag{6}$$

$$A = \begin{bmatrix} 0 & 0 & 1 & 0 & 0 \\ 0 & 0 & 0 & 1 & 0 \\ -\frac{k_s}{m_s} & \frac{k_s}{m_s} & 0 & 0 & -\frac{A_p}{m_s} \\ \frac{k_s}{m_u} & -\frac{(k_s+k_u)}{m_u} & 0 & 0 & \frac{A_p}{m_u} \\ 0 & 0 & \alpha A_p & -\alpha A_p & 0 \end{bmatrix} \tag{7}$$

$$B = [0, 0, 0, 0, -\alpha C_d]^T \tag{8}$$

$$d = \left[0, 0, 0, \frac{k_u}{m_u}, x_d, 0\right]^T \tag{9}$$

The notation $[\ ]^T$ indicates the transpose of the vector. If the disturbance $x_d$ is unknown, then the following analysis is used to find a control $u = A_v$. A candidate positive definite functional is first selected.

$$V = \tfrac{1}{2} x^T Q x, \quad Q \geq 0 \tag{10}$$

Q is symmetric. The first time derivative of V is $$\dot{V} = \tfrac{1}{2} x^T [A^T Q + QA] x + x^T Q B g(\Delta p) u + x^T Q d \tag{11}$$

The work assumes the existence of a Q that satisfies the following inequality:

$$A^T Q + QA \leq 0 \tag{12}$$

The objective of the proposed control is to dissipate the energy in the system. This is accomplished by making $\dot{V}$ as large a negative as possible. The sign of the last term cannot be regulated. Therefore, it is disregarded. The first expression is always negative, per the inequality given in Equation (12). The objective is accomplished then by choosing the orifice area $A_v$ so as to maximize the negativity of the second term. Noting that $$\sqrt{\frac{2|\Delta P|}{\rho}}$$

is always positive, then the desired objective is realized with the following bistate logic:

$$\begin{cases} A_v = A_{vmax} & \text{if } x^T QB \; sgn(\Delta p) < 0 \\ A_v = A_{vmin} & \text{if } x^T QB \; sgn(\Delta p) \geq 0 \end{cases} \tag{13}$$

In general $A_{vmax}$ implies the maximum orifice area opening and $A_{vmin}$ implies closure of the valve. Careful design analysis of the system may, however, indicate that the optimal choice of $A_{vmax}$ may be at a partially open position and alternatively the optimal choice of $A_{vmin}$ may be at a partially closed position.

The preceding control approach is generally referred to as saturation control. It will be appreciated that the designer must select ("tune") Q to provide a desired level of performance.

In the second mode, the motion of the bridge 14 is estimated numerically using the sensors 28 and 30 on board the vehicle 12. In addition to the sensors used in the first mode, the vehicle 12 might also be outfitted with auxiliary sensors to measure the dynamic variation of air pressure in the tires and/or the forces transmitted to the axle 16 by the tires. The dynamic modeling for this scenario reflects a synthesis of the vehicle dynamics and the (estimated) dynamics of the disturbance. Recalling that the vehicle dynamics take the form of Equation (5):

$$\dot{x} = Ax + Bg(x)u + d \tag{5}$$

The estimation of the disturbance is based on a backward finite difference approximation of the disturbance. A discrete representation of that recursive process has the form:

$$d^N + \alpha_{N-1} d^{N-1} + \ldots + \alpha_1 d^1 = F_{tire} \tag{14}$$

$$F_{tire} = k_u(x_{u-d}) \tag{14a}$$

where $d^n$ is the nth past value of the estimated bridge disturbance at the vehicle tire interface. This process identification approach assumes that the force in the tire is measured (other approaches are technically possible). The disturbance model can be cast in a state space form as:

$$z \underline{\Delta} \{d^N, d^{N-1}, \ldots, d^1\} \tag{15}$$

The dynamics of the disturbance can then be expressed as:

$$\dot{z} = \tilde{D} z + \tilde{R} x \tag{16}$$

where $\tilde{R}$ is a mapping between $K, x_u$ and $x$ and $\tilde{D}$ is defined as:

$$\tilde{D} = \begin{Bmatrix} 0 & 0 & \cdots & 1 & \cdots & 0 \\ 0 & 0 & \cdots & 1 & \cdots & 0 \\ \vdots & \vdots & \ddots & \vdots & \vdots & \vdots \\ -\alpha_{N-1} & -\alpha_{N-2} & \cdots & \cdots & \alpha_0 & 0 \end{Bmatrix} \tag{17}$$

The controller 24 will be programmed to update the entries in the $\tilde{D}$ matrix at each instant that the sensor data is processed. Once the disturbance model is established, the control design mimics the approach used in the first mode. Defining $\omega = \{x, z\}^T$, and noting that the disturbance vector d in Equation (5) can be represented as $d = \tilde{C} z$, where $\tilde{C}$ is an appropriately defined Boolean matrix (entries are either 1 or 0), then the state space and disturbance models, Equations (5) and (16) can then be combined as follows:

$$\dot{\omega} = \tilde{A}^* \omega, \text{ when } \tilde{A}^* = \begin{Bmatrix} A & \tilde{C} \\ \tilde{D} & \tilde{R} \end{Bmatrix} \tag{18}$$

Defining the Lyapunov Function:

$$V = \omega^T Q \omega; \quad Q \geq 0 \tag{19}$$

Then the control is easily shown to be of the same form as that established previously, on:

$$\begin{cases} A_v = A_{vmax} & \text{if } \omega^T \ QB \ sgn(\Delta p) < 0 \\ A_v = A_{vmin} & \text{if } \omega^T \ QB \ sgn(\Delta p) \geq 0 \end{cases} \quad (20)$$

The elements of Q are selected to emphasize the design objective. In this case, two related objectives are evident: the minimization of the deflection of the bridge and the minimization of the variation of the tire force relative to the static tire force.

In the third mode of operation, the output of various motion sensors mounted on the bridge are transmitted to the vehicle controller 24.

Figure 4:
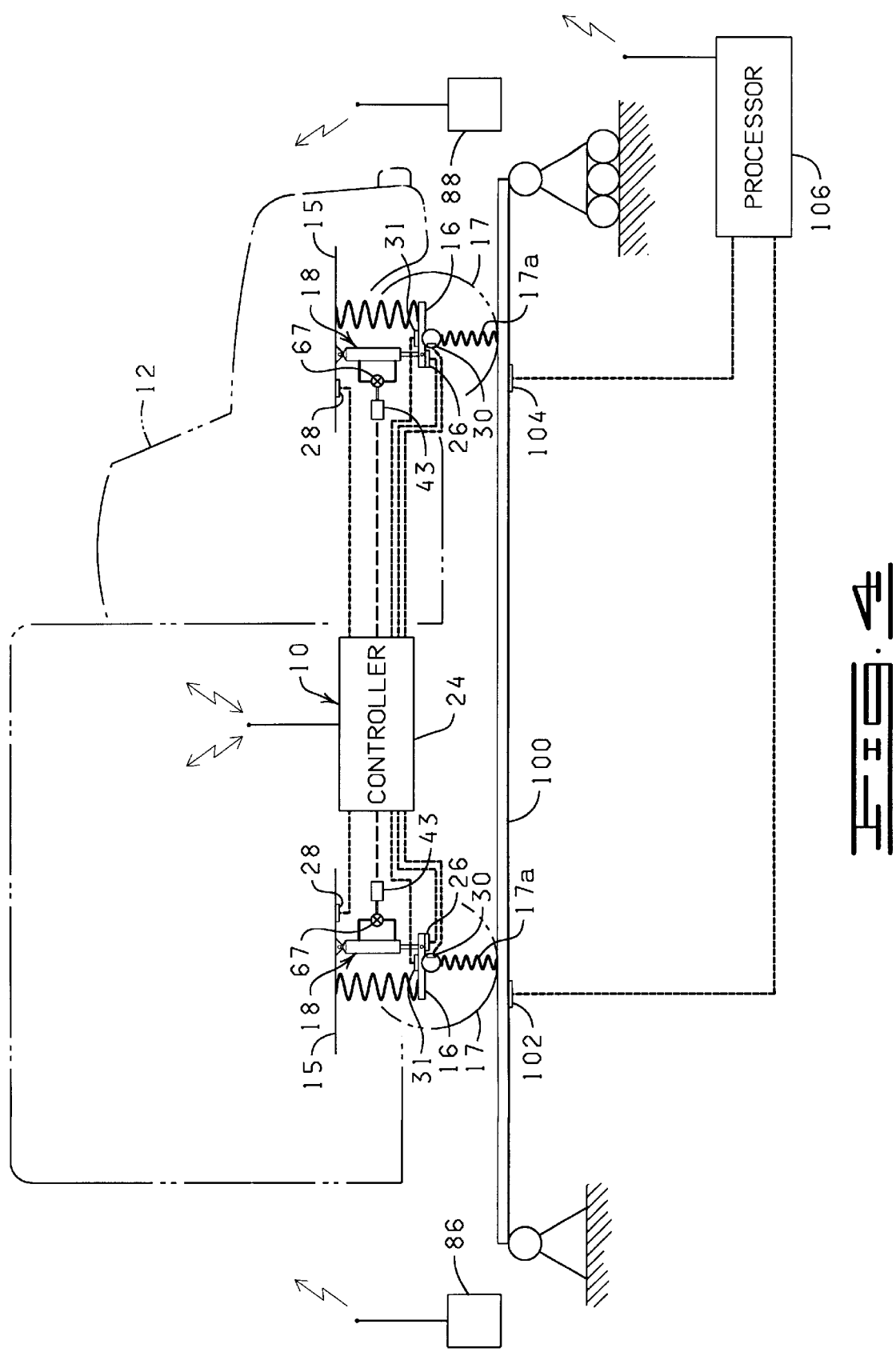
FIG. 4 is a schematic view of the truck of FIG. 1 traveling across a bridge equipped with a plurality of sensors.

FIG. 4 shows the vehicle 12 with the vibration mitigation assembly 10 traveling across another bridge 100. The bridge 100 is provided with a plurality of sensors, such as sensors 102 and 104, and a processor 106. The sensors 102 and 104 produce data signals indicative of the motion or deformation of the bridge 100. The processor 106 receives the data signals and transmits this information, via wireless communication, to the controller 24 of the vehicle mitigation assembly 10 on board the vehicle 12 whereby the vehicle mitigation assembly 10 is designed to operate in the third mode wherein control decisions for operating the control valve 67 are made based on a combination of the dynamics of the vehicle 12 and the dynamics of the bridge 100.

This control design is based on the following bridge/vehicle dynamic model:

$$M_b \ddot{y} + C_b \dot{y} + K_b y = k_u \phi(t)(\Phi^T z - \phi(t)^T y) \quad (21)$$

where $y \in R^{m \times l}$. The vehicle motion equations (including the semi-active actuator) take the form:

$$M_t \ddot{z} + C_t \dot{z} + K_t z = -k_u \Phi(\Phi^T z - \phi(t)^T y) + b_t A_{pt} \Delta p \quad (22)$$

where $z \in R^{n \times l}$ and $b_T = [1, -1]^T$. When combining Equations (21) and (22), the general equations of the system (vehicle/bridge) can then be written as:

$$M\ddot{v} + C\dot{v} + K(t)v = b^* u \quad (23)$$

where $v = [y, z]^T$; $v \in R^{k=m+n}$; $b^* = [0, b_t]^T$, $u = A_{pt} \Delta p$; and $$M = \begin{bmatrix} M_b & 0 \\ 0 & M_1 \end{bmatrix} \quad (24)$$

$$C = \begin{bmatrix} C_b & 0 \\ 0 & C_1 \end{bmatrix}$$

$$K(t) = \begin{bmatrix} K_b + k_u \varphi(t) \varphi(t)^T & -k_u \varphi(t) \Phi(t)^T \\ -k_u \Phi \varphi(t)^T & K_1 + k_u \Phi \Phi^T \end{bmatrix}$$

The state space form of the bridge/vehicle model can be expressed as:

$$\begin{bmatrix} \dot{v} \\ \ddot{v} \end{bmatrix} = \begin{bmatrix} 0 & I \\ -M^{-1}K(t) & -M^{-1}C \end{bmatrix} \begin{bmatrix} v \\ \dot{v} \end{bmatrix} + \begin{bmatrix} 0 \\ -M^{-1}b^* \end{bmatrix} \quad (25)$$

Recalling the actuator dynamics (Equation (1)) and defining the relative velocity across the hydraulic actuator as:

$$\dot{S} = \dot{z}_1 - \dot{z}_2 = (N, \dot{v}) \quad (26)$$

where $N = [0, 0, \ldots, 1, -1]^T$, then the actuator dynamics are expressed as:

$$\Delta \dot{p} = -\alpha \beta \{ A_p(N, \dot{v}) + g(\Delta p) C_d A_v \} \quad (27)$$

Defining $s = \{v, \dot{v}, \Delta p\}^T$, then the following system of equations represent the vehicle/bridge actuator dynamics:

$$\dot{s} = A(t)s + Bg(\Delta p)A_v \quad (28)$$

where $$A(t) = \begin{bmatrix} [0] & [I] & [0] \\ [-M^{-1}K(t)] & [-M^{-1}K(t)] & [A_{pt} - M^{-1}b*] \\ [0] & [-\alpha A_{pt} N^T] & [0] \end{bmatrix}, \quad (29)$$

$$B = \begin{bmatrix} [0] \\ [0] \\ -\alpha \beta C_d \end{bmatrix}$$

As in the first and second control modes described above, the third control mode requires the use of a control synthesis method. Using the Lyapunov approach (see Equations (10)–(13)) produces the control rule for this case.

$$\begin{cases} A_v = A_{vmax} & \text{if } s^T \ QB \ sgn(\Delta p) < 0 \\ A_v = A_{vmin} & \text{if } s^T \ QB \ sgn(\Delta p) \geq 0 \end{cases} \quad (30)$$

As noted previously, the user must "tune" the selection of he weighting matrix Q to accomplish best results.

Figure 5:
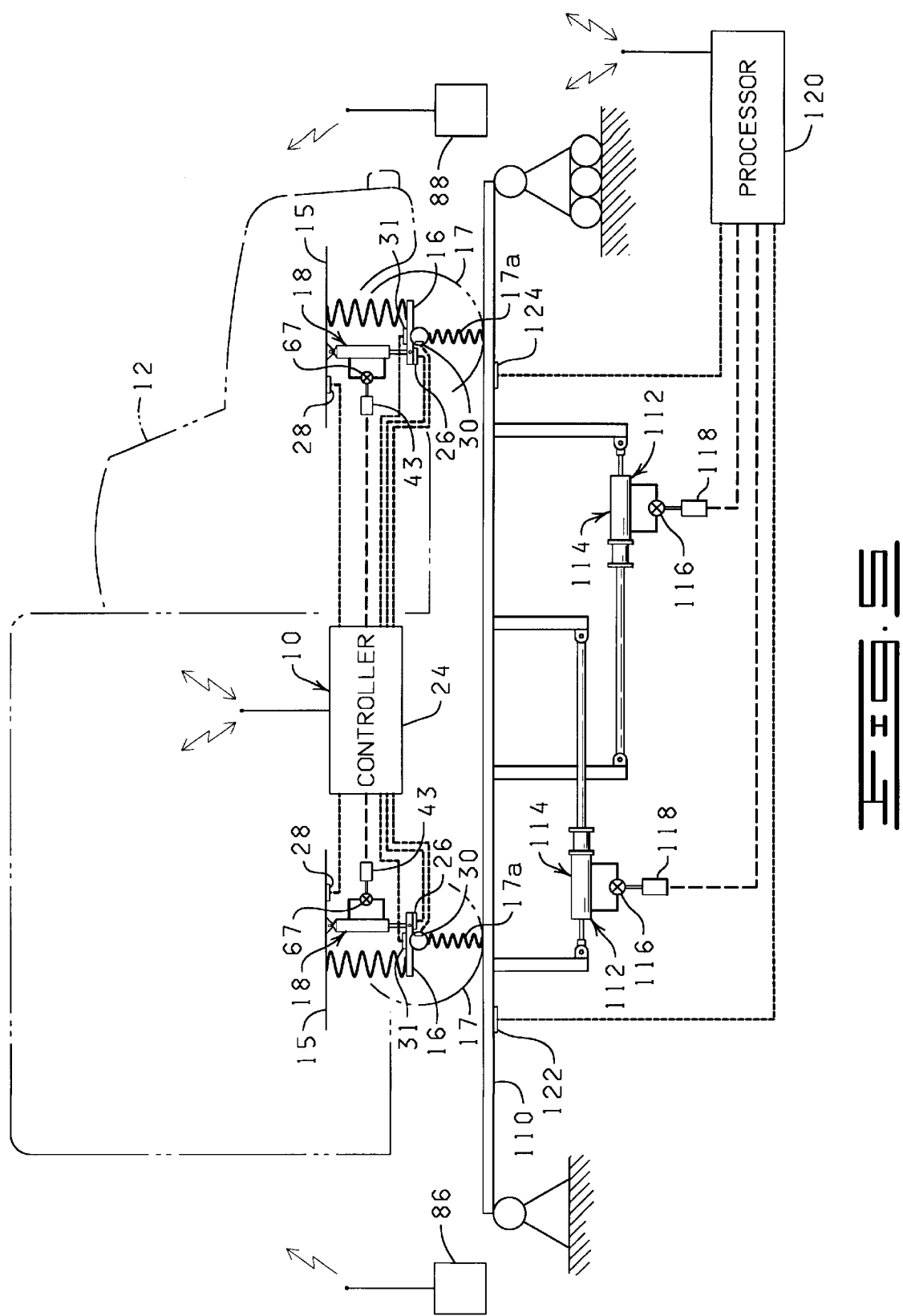
FIG. 5 is a schematic view of the truck of FIG. 1 traveling across a bridge equipped with a pair of vibration mitigation assemblies.

The fourth mode of control is depicted in FIG. 5 which shows he vehicle 12 equipped with the vehicle mitigation assembly 10 traveling across another bridge 110. To optimally mitigate vibration, the bridge 110 is equipped with one or more vibration mitigation assemblies 112 which are designed to work in conjunction with the vibration mitigation assembly 10 to minimize deflection of the bridge 110. Broadly, each vibration mitigation assembly 112 mounted to the bridge 110 includes a hydraulic cylinder assembly 114, a control valve 116 for regulating the flow of fluid between the first and second chambers of the cylinder assembly 114, a motor 118 operably connected to the control valve 116, and a processor 120 electrically connected to the motor 118. The vibration mitigation assemblies 112 are described in greater detail in U.S. Pat. No. 5,595,372, issued to William N. Patten, and expressly incorporated herein by reference.

As the vehicle 12 is traveling across the bridge 110, a plurality of sensors 122 and 124 produce data signals indicative of the movement or deformation of the bridge 110. Other sensors (not shown) produce data signals indicative of the pressure differential between a first fluid chamber and a second fluid chamber of the cylinder assembly 114, and data signals indicative of the relative velocity of the piston across the cylinder assembly 114. The processor 120 receives all the data signals and transmits this information to the controller 24 of the vibration mitigation assembly 10 on board the vehicle 12. The controller 24 of the vibration mitigation assembly 10 in turn generates and transmits a control signal to the vibration mitigation assembly 10 and the vibration mitigation assemblies 112 based on the combined dynamics of the vehicle 12 and the bridge 110 to effectively mitigate vibration of the bridge 110.

The state space equations of motion of the combined vehicle/bridge system can be expressed as:

$$\dot{\eta} = A(t)\eta + B_1 u + B_2 q \quad (31)$$

where A(t) is the general time-varying system compliance for the coupled vehicle/bridge system, and η is a vector of generalized coordinates for the system; $B_1$ is a Boolean matrix that represents a mapping between generalized vehicle/bridge states and the control moment input of the vibration mitigation assemblies 112; and $B_2$ is a second Boolean matrix that represents a mapping between the generalized vehicle/bridge states and the control input from the vehicle actuator. The control force created by the bridge actuator is expressed here as:

$$u = hA_b \Delta p_b \tag{32}$$

where h is the distance from the neutral axis of steel bridge girders to the tip of the moment arms and $A_b$ is the effective area of the cylinder assembly 114 of the vibration mitigation assembly 112. The control force created by the vibration mitigation assembly 10 of the vehicle 12 is defined as:

$$q = A_t \Delta p_t \tag{33}$$

where $A_t$ is the effective area of the actuator assembly 18 of the vibration mitigation assembly 10. Defining $r=[\eta,(\Delta p_b)(\Delta p_t)]^T$, then the combined bridge/vehicle/actuator dynamics become:

$$\dot{r} = A(t)r + B_b g(\Delta P_b)A_{vb} + B_t g(\Delta P_t)A_{vt} \tag{34}$$

where $$A = \begin{bmatrix} [0] & [I] & [0] & [0] \\ [-M^{-1}K(t)] & [-M^{-1}C] & [hC_d A_b M^{-1}\Gamma] & [C_d A_1 M^{-1}\Pi] \\ [0] & [-\alpha\beta A_b \hat{R}] & [0] & [0] \\ [0] & [0] & [-\alpha\beta A_1 \hat{T}] & [0] \end{bmatrix} \tag{35}$$

and $$B_b = \begin{bmatrix} [0] \\ [0] \\ [-\alpha\beta A_{pb}] \\ [0] \end{bmatrix}, B_1 = \begin{bmatrix} [0] \\ [0] \\ [0] \\ [-\alpha\beta A_{pb}] \end{bmatrix} \tag{36}$$

The Lyapunov control design discussed above is employed again to produce a bistate control for the regulation of the control valves on the bridge 110 and vehicle 12. A global Lyapunov function of the form:

$$V = \tfrac{1}{2} r^T Q r, \ Q \geq 0, \tag{37}$$

is selected. The first time derivative of V is:

$$\dot{V} = \tfrac{1}{2} r^T((t)^T Q + Q(t))r + r^T Q(B_b g(\Delta p_b)A_{vb} + B_t g(\Delta p_t)A_{vt}) \tag{38}$$

As above, the work assumes the existence of a Q such that:

$$\tilde{A}(t)^T Q + Q\tilde{A}(t) \leq 0 \tag{39}$$

The control objective to dissipate the system's energy, which is accomplished by forcing the dissipativeness of the system ($\dot{V}$) to be maximally negative. That is achieved by regulating the valve orifice area on the vibration mitigation assembly 10 of the vehicle 12 and the vibration mitigation assembly 112 of the bridge 110 in the following way:
For bridge, if:

$$r^T Q B_b g(\Delta p_b) \begin{cases} \geq 0, & \text{then } A_{vbmin} = 0 \\ < 0, & \text{then } A_{vb} = A_{vbmax} \end{cases} \tag{40}$$

and for vehicle, if:

$$r^T Q B_t g(\Delta p_t) \begin{cases} \geq 0, & \text{then } A_{vtmin} = 0 \\ < 0, & \text{then } A_{vt} = A_{vtmax} \end{cases} \tag{41}$$

This design provides a global approach to the mitigation of bridge vibration. It will be appreciated that the designer must tune the selection of Q to achieve the best possible results.

While the vibration mitigation assembly 10 has been described as employing an electromechanical valve or variable orifice to alter the flow resistance of the fluid, it will be appreciated by those of ordinary skill in the art that actuator assemblies that utilize magnetorheological fluids (MR) or electrorheological fluids (ER) to alter the flow resistance may be employed as an alternative. As is well known, MR fluids are fluids that are capable of having their viscosity significantly changed by application of a magnetic field, and ER fluids are fluids that are capable of having their viscosity significantly changed by application of an electric field. By controlling the magnetic field or the electric field applied to the MR fluids and the ER fluids, respectively, the flow resistance of the fluids is controlled so as to provide the appropriate amount of stiffness and damping to prevent resonant coupling between the vehicle and the bridge.

The advantage of the present invention is that it allows vehicles, such as heavy trucks, to be retrofitted with a vibration mitigation assembly that functions to extend the life of bridges at a low cost. The vibration mitigation assembly of the present invention provides a practical and cost-effective manner of significantly reducing the maximum amplitude of vibration and thus decreasing the stress range of the bridge and extending the fatigue life of the bridge. Also, while the vibration mitigation assembly of the present invention has been described as being employed with a truck to suppress unwanted vibration in bridges, it will be understood that the vibration mitigation assembly of the present invention can be used to suppress unwanted vibration in other structures, including for example, support assemblies for monorail and railway systems.

From the above description, it is clear that the present invention is well adapted to carry out the objects and to attain the advantages mentioned herein, as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A vibration mitigation assembly for mitigating vibration of a bridge as a vehicle travels across the bridge, the assembly comprising:
    a plurality of adjustable actuator assemblies mountable to the vehicle, each actuator assembly comprising:
        a cylinder having a first end and a second end, the second end of the cylinder adapted to be connected to a portion of the vehicle;
        a piston slidably disposed in the cylinder, the piston defining a first fluid chamber and a second fluid chamber in the cylinder with each of the first and second fluid chambers having a fluid disposed therein;
        a piston rod having one end connected to the piston and another end extending from the first end of the cylinder and adapted to be connected to another portion of the vehicle; and a valve interconnecting the first fluid chamber to the second fluid chamber so as to provide fluid flow between the first fluid chamber and the second fluid chamber and so as to regulate the flow of the fluid between the first fluid chamber and the second fluid chamber;

vehicle sensor means for measuring the vibration of the vehicle and for generating a data signal representing the vibration of the vehicle;

piston sensor means for measuring the movement of each piston relative to its corresponding cylinder and for generating a data signal representing the movement of each piston relative to the cylinder;

pressure sensor means for measuring the pressure in the first fluid chamber and the second fluid chamber of each cylinder and for generating a data signal representing the pressure differential between the first fluid chamber and the second fluid chamber of each cylinder; and vehicle control means for generating a control signal in response to the data signals received by the vehicle control means from the vehicle sensor means, the piston sensor means, and the pressure sensor means, and for outputting the control signal to the valve means to regulate the flow of the fluid between the first and second fluid chambers of the cylinders such that the amount of vibration energy dissipated by the vibration mitigation assembly is selectively varied whereby both a stiffness of the adjustable actuator assemblies and the amount of damping are continuously adjusted to prevent resonant coupling between the vehicle and the bridge.

2. The assembly of claim 1 further comprising :

means for switching the vehicle control means from a normal mode wherein each of the actuator assemblies operates as a passive damper to a bridge mode upon the vehicle entering the bridge and for switching the vehicle control means from the bridge mode back to the normal mode upon the vehicle exiting the bridge.

3. The assembly of claim 1 wherein the vehicle control means is connected to the valve via a dc motor.

4. The assembly of claim 3 wherein the motor is connected to the valve via a flexible helical coupling which is axially flexible while being torsionally rigid to minimize torque load on the motor.

5. The assembly of claim 3 wherein the motor is powered by a battery.

6. The assembly of claim 1 wherein the fluid is a compressible fluid.

7. The assembly of claim 6 wherein the compressibility of the fluid is in a range of about $2.7 \times 10^6$ m$^2$/N to about $2.7 \times 10^8$ m$^2$/N.

8. A vibration mitigation assembly for mitigating vibration of a bridge as a vehicle travels across the bridge, the assembly comprising:

bridge sensor means for measuring the vibration of the bridge and for generating a data signal representing the vibration of the bridge;

bridge control means for transmitting the data signal of the bridge sensor means;

a plurality of adjustable actuator assemblies mountable to the vehicle, each actuator assembly comprising:

a cylinder having a first end and a second end, the second end of the cylinder adapted to be connected to a portion of the vehicle;

a piston slidably disposed in the cylinder, the piston defining a first fluid chamber and a second fluid chamber in the cylinder with each of the first and second fluid chambers having a fluid disposed therein;

a piston rod having one end connected to the piston and another end extending from the first end of the cylinder and adapted to be connected to another portion of the vehicle; and a valve interconnecting the first fluid chamber to the second fluid chamber so as to provide fluid flow between the first fluid chamber and the second fluid chamber and so as to regulate the flow of the fluid between the first fluid chamber and the second fluid chamber;

vehicle sensor means for measuring the vibration of the vehicle and for generating a data signal representing the vibration of the vehicle;

piston sensor means for measuring the movement of each piston relative to its corresponding cylinder and for generating a data signal representing the movement of each piston relative to the cylinder;

pressure sensor means for measuring the pressure in the first fluid chamber and the second fluid chamber of each cylinder and for generating a data signal representing the pressure differential between the first fluid chamber and the second fluid chamber of each cylinder; and vehicle control means for generating a control signal in response to the data signals received by the vehicle control means from the vehicle sensor means, the piston sensor means, the pressure sensor means, and the bridge control means, and for outputting the control signal to the valve to regulate the flow of the fluid between the first and second fluid chambers of the cylinders such that the amount of vibration energy dissipated by the vibration mitigation assembly is selectively varied whereby both a stiffness of the adjustable actuator assemblies and the amount of damping are continuously adjusted to prevent resonant coupling between the vehicle and the bridge.

9. The assembly of claim 8 further comprising:

means for switching the vehicle control means from a normal mode wherein each of the actuator assemblies operates as a damper to a bridge mode upon the vehicle entering the bridge and for switching the vehicle control means from the bridge mode to the normal mode upon the vehicle exiting the bridge.

10. The assembly of claim 8 wherein the vehicle control means is connected to the valve via a dc motor.

11. The assembly of claim 10 wherein the motor is connected to the valve via a flexible helical coupling which is axially flexible while being torsionally rigid to minimize torque load on the motor.

12. The assembly of claim 10 wherein the motor is powered by a battery.

13. The assembly of claim 8 wherein the fluid is a compressible fluid.

14. The assembly of claim 13 wherein the compressibility of the fluid is in a range of about $2.7 \times 10^6$ m$^2$/N to about $2.7 \times 10^9$ m$^2$/N.

15. A method of mitigating vibration of a bridge as a vehicle having a chassis connected to an axle travels across the bridge, comprising:

monitoring the vibration of the chassis of the vehicle as the vehicle travels across the bridge; and adjusting the vibrational mode of the chassis of the vehicle so as to prevent resonant coupling between the vehicle and the bridge.

16. The method of claim 15 wherein the vibrational mode of the vehicle is adjusted with a plurality of actuator assemblies and a controller wherein each actuator assembly includes a cylinder having a first end and a second end with a piston slidably disposed in the cylinder so as to define a first fluid chamber and a second fluid chamber in the cylinder, the piston having a piston rod extending from the first end of the cylinder, each of the first and second pressure chambers having a fluid disposed therein, the first fluid chamber and the second fluid chamber of each actuator assembly interconnected with a valve which is adjusted by the controller so as to provide regulated fluid communication between the first fluid chamber and the second fluid chamber, the first end of each cylinder connected to a portion of the vehicle and each piston rod connected to another portion of the vehicle, and wherein the method further comprises:

switching the controller from a normal mode wherein each of the actuator assemblies operates as a damper to a bridge mode upon the vehicle entering the bridge; and switching the controller from the bridge mode to the normal mode upon the vehicle exiting the bridge.

17. A method of mitigating vibration of a bridge as a vehicle having a chassis connected to an axle travels across the bridge, comprising:

monitoring the vibration of the chassis of the vehicle as the vehicle travels across the bridge;

estimating the vibration of the bridge as the vehicle travels across the bridge; and adjusting the vibrational mode of the chassis of the vehicle so as to prevent resonant coupling between the vehicle and the bridge.

18. The method of claim 17 wherein the vibrational mode of the vehicle is adjusted with a plurality of actuator assemblies and a controller wherein each actuator assembly includes a cylinder having a first end and a second end with a piston slidably disposed in the cylinder so as to define a first fluid chamber and a second fluid chamber in the cylinder, the piston having a piston rod extending from the first end of the cylinder, each of the first and second pressure chambers having a fluid disposed therein, the first fluid chamber and the second fluid chamber of each actuator assembly interconnected with a valve which is adjusted by the controller so as to provide regulated fluid communication between the first fluid chamber and the second fluid chamber, the first end of each cylinder connected to a portion of the vehicle and each piston rod connected to another portion of the vehicle, and wherein the method further comprises:

switching the controller from a normal mode wherein each of the actuator assemblies operates as a passive damper to a bridge mode upon the vehicle entering the bridge; and switching the controller from the bridge mode to the normal mode upon the vehicle exiting the bridge.

19. A method of mitigating vibration of a bridge as a vehicle having a chassis connected to an axle travels across the bridge, comprising:

monitoring the vibration of the chassis of the vehicle as the vehicle travels across the bridge;

monitoring the vibration of the bridge as the vehicle travels across the bridge; and adjusting the vibrational mode of the chassis of the vehicle so as to prevent resonant coupling between the vehicle and the bridge.

20. The method of claim 19 wherein the vibrational mode of the vehicle is adjusted with a plurality of actuator assemblies and a controller wherein each actuator assembly includes a cylinder having a first end and a second end with a piston slidably disposed in the cylinder so as to define a first fluid chamber and a second fluid chamber in the cylinder, the piston having a piston rod extending from the first end of the cylinder, each of the first and second pressure chambers having a fluid disposed therein, the first fluid chamber and the second fluid chamber of each actuator assembly interconnected with a valve which is adjusted by the controller so as to provide regulated fluid communication between the first fluid chamber and the second fluid chamber, the first end of each cylinder connected to a portion of the vehicle and each piston rod connected to another portion of the vehicle, and wherein the method further comprises:

switching the controller from a normal mode wherein each of the actuator assemblies operates as a damper to a bridge mode upon the vehicle entering the bridge; and switching the controller from the bridge mode to the normal mode upon the vehicle exiting the bridge.

21. A method of mitigating vibration of a bridge as a vehicle having a chassis connected to an axle travels across the bridge, comprising:

monitoring the vibration of the chassis of the vehicle as the vehicle travels across the bridge;

monitoring the vibration of the bridge as the vehicle travels across the bridge; and adjusting the vibrational mode of the chassis of the vehicle and the vibrational mode of the bridge so as to prevent resonant coupling between the vehicle and the bridge.

22. The method of claim 21 wherein the vibrational mode of the vehicle is adjusted with a plurality of actuator assemblies and a controller wherein each actuator assembly includes a cylinder having a first end and a second end with a piston slidably disposed in the cylinder so as to define a first fluid chamber and a second fluid chamber in the cylinder, the piston having a piston rod extending from the first end of the cylinder, each of the first and second pressure chambers having a fluid disposed therein, the first fluid chamber and the second fluid chamber of each actuator assembly interconnected with a valve which is adjusted by the controller so as to provide regulated fluid communication between the first fluid chamber and the second fluid chamber, the first end of each cylinder connected to a portion of the vehicle and each piston rod connected to another portion of the vehicle, and wherein the method further comprises:

switching the controller from a normal mode wherein each of the actuator assemblies operates as a passive damper to a bridge mode upon the vehicle entering the bridge; and switching the controller from the bridge mode to the normal mode upon the vehicle exiting the bridge.

23. A vibration mitigation assembly for mitigating vibration of a bridge as a vehicle travels across the bridge, the assembly comprising:

a plurality of adjustable actuator assemblies mountable to the vehicle, each actuator assembly comprising:

a cylinder having a first end and a second end, the second end of the cylinder adapted to be connected to a portion of the vehicle;

a piston slidably disposed in the cylinder, the piston defining a first fluid chamber and a second fluid chamber in the cylinder with each of the first and second fluid chambers having a fluid disposed therein;

a piston rod having one end connected to the piston and another end extending from the first end of the cylinder and adapted to be connected to another portion of the vehicle; and flow resistance altering means for selectively altering the amount of resistance provided by the fluid disposed in the first and second fluid chambers to the movement of the piston through the cylinder;

vehicle sensor means for measuring the vibration of the vehicle and for generating a data signal representing the vibration of the vehicle;

piston sensor means for measuring the movement of each piston relative to its corresponding cylinder and for generating a data signal representing the movement of each piston relative to the cylinder;

pressure sensor means for measuring the pressure in the first fluid chamber and the second fluid chamber of each cylinder and for generating a data signal representing the pressure differential between the first fluid chamber and the second fluid chamber of each cylinder; and vehicle control means for generating a control signal in response to the data signals received by the vehicle control means from the vehicle sensor means, the piston sensor means, and the pressure sensor means, and for outputting the control signal to the flow resistance altering means to regulate the amount of resistance to the movement of the piston such that the amount of vibration energy dissipated by the vibration mitigation assembly is selectively varied whereby both a stiffness of the adjustable actuator assemblies and the amount of damping are continuously adjusted to prevent resonant coupling between the vehicle and the bridge.

24. The assembly of claim 23 further comprising:

means for switching the vehicle control means from a normal mode wherein each of the actuator assemblies operates as a passive damper to a bridge mode upon the vehicle entering the bridge and for switching the vehicle control means from the bridge mode back to the normal mode upon the vehicle exiting the bridge.

25. A vibration mitigation assembly for mitigating vibration of a bridge as a vehicle travels across the bridge, the assembly comprising:

bridge sensor means for measuring the vibration of the bridge and for generating a data signal representing the vibration of the bridge;

bridge control means for transmitting the data signal of the bridge sensor means;

a plurality of adjustable actuator assemblies mountable to the vehicle, each actuator assembly comprising:

a cylinder having a first end and a second end, the second end of the cylinder adapted to be connected to a portion of the vehicle;

a piston slidably disposed in the cylinder, the piston defining a first fluid chamber and a second fluid chamber in the cylinder with each of the first and second fluid chambers having a fluid disposed therein;

a piston rod having one end connected to the piston and another end extending from the first end of the cylinder and adapted to be connected to another portion of the vehicle; and flow resistance altering means for selectively altering the amount of resistance provided by the fluid disposed in the first and second fluid chambers to the movement of the piston through the cylinder;

vehicle sensor means for measuring the vibration of the vehicle and for generating a data signal representing the vibration of the vehicle;

piston sensor means for measuring the movement of each piston relative to its corresponding cylinder and for generating a data signal representing the movement of each piston relative to the cylinder;

pressure sensor means for measuring the pressure in the first fluid chamber and the second fluid chamber of each cylinder and for generating a data signal representing the pressure differential between the first fluid chamber and the second fluid chamber of each cylinder; and vehicle control means for generating a control signal in response to the data signals received by the vehicle control means from the vehicle sensor means, the piston sensor means, the pressure sensor means, and the bridge control means, and for outputting the control signal to the flow resistance altering means to regulate the amount of resistance to the movement of the piston such that the amount of vibration energy dissipated by the vibration mitigation assembly is selectively varied whereby both a stiffness of the adjustable actuator assemblies and the amount of damping are continuously adjusted to prevent resonant coupling between the vehicle and the bridge.

26. The assembly of claim 25 further comprising:

means for switching the vehicle control means from a normal mode wherein each of the actuator assemblies operates as a damper to a bridge mode upon the vehicle entering the bridge and for switching the vehicle control means from the bridge mode to the normal mode upon the vehicle exiting the bridge.

* * * * *

UNITED STATES PATENT AND TRADEMARK OFFICE
CERTIFICATE OF CORRECTION

PATENT NO. : 6,053,269
DATED : April 25, 2000
INVENTOR(S) : William N. Patten

Page 1 of 1

It is certified that error appears in the above-identified patent and that said Letters Patent is hereby corrected as shown below:

Column 10,
Delete equation "(17)" and substitute therefor the following $$\tilde{D} = \begin{bmatrix} 0 & 0 & \cdots & 1 & \cdots & 0 \\ 0 & 0 & \cdots & 1 & \cdots & 0 \\ \vdots & \vdots & \ddots & \vdots & \vdots & \vdots \\ -\alpha_{N-1} & -\alpha_{N-2} & \cdots & \cdots & \alpha_0 & 0 \end{bmatrix} \quad (17)$$

Column 12,
Line 26, delete "he" and substitute therefor -- the --
Line 28, delete "he" and substitute therefor -- the --

Column 13,
Delete equation "(38)" and substitute therefor the following $$V = \frac{1}{2} r^2 \left( \underset{\sim}{A(t)}^T Q + Q \underset{\sim}{A(t)} \right) r + r^T Q (B_h g(\Delta p_h) A_{vb} + B_1 g(\Delta p_1) A_{vt}) \quad (38)$$

Delete equation "(39)" and substitute therefor the following $$\underset{\sim}{A(t)}^T Q + Q \underset{\sim}{A(t)} \leq 0 \quad (39)$$

Signed and Sealed this

Twelfth Day of February, 2002

Attest:

JAMES E. ROGAN
Attesting Officer        Director of the United States Patent and Trademark Office